(Model.)
T. & S. N. BROWN.
HUB FOR VEHICLE WHEELS.
No. 266,251. Patented Oct. 17, 1882.
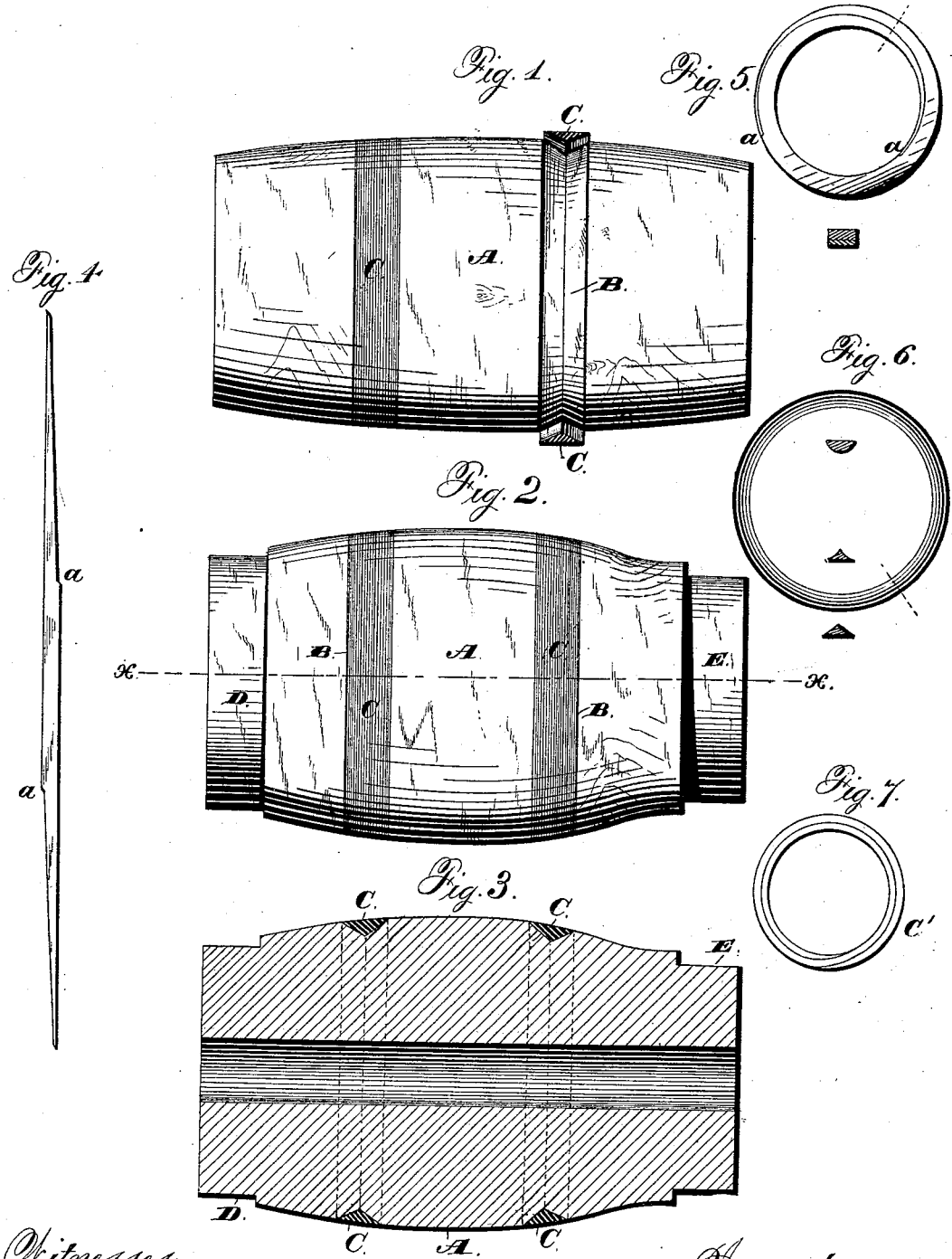
Witnesses
Jas. E. Hutchinson
J. A. Rutherford
Inventors
Thomas Brown and Saml. N. Brown,
By their Attorney,
James L. Norris.

UNITED STATES PATENT OFFICE.

THOMAS BROWN AND SAMUEL N. BROWN, OF DAYTON, OHIO, ASSIGNORS TO S. N. BROWN & CO., OF SAME PLACE.

HUB FOR VEHICLE-WHEELS.

SPECIFICATION forming part of Letters Patent No. 266,251, dated October 17, 1882.

Application filed August 15, 1882. (Model.)

*To all whom it may concern:*

Be it known that we, THOMAS BROWN and SAMUEL N. BROWN, citizens of the United States, residing at Dayton, in the county of Montgomery and State of Ohio, have invented new and useful Improvements in Hubs for Vehicles, of which the following is a specification.

This invention relates to that class of wooden hubs in which the hub is provided with one or more metallic strengthening-bands occupying annular grooves formed in its periphery.

Prior to our invention the metallic strengthening-band has been slipped on the hub and over one of the annular grooves therein, and the band then bodily upset by driving the hub into a conical-shaped female die, the inclined walls of which reduce the diameter of the band and slightly increase its width and thickness, so that it shall engage with considerable pressure the wooden portion of the hub embraced by it. This mode of securing the strengthening-band on the hub requires the groove to be formed at its side nearest the spoke-line with an abrupt side or shoulder, which will prevent the band from slipping farther on the hub when the latter is forced into the conical female die. The pressure exerted by the band laterally against said side or shoulder and in the direction of the grain of the wood necessitates a heavy strain or pressure against the bridge or that part of the periphery of the hub that lies between the bands, which with our manner of compressing is entirely avoided. If said side of the groove is inclined relatively to the axis of the hub, the same difficulty will be found to exist, since in driving the hub into the conical die the pressure upon the band will be directed obliquely to the axis of the hub and the band pressed against the side of the groove nearest to the spoke-line in the direction of the grain of the wood.

It is the object of our invention to obviate such defect, and to upset the band upon an annularly-grooved hub without injury to the latter, and in such way that the fibers of the wood at the sides of the groove shall be compressed toward the center of the hub. To such end we form a metallic strengthening-band, as hereinafter described, and, after slipping it upon the hub and over the annular groove therein, subject the entire strengthening-band to a uniform pressure, acting upon its entire surface in radial or concentering lines at right angles to the axis of the hub, thereby reducing the diameter of the ring or band and compressing the same into the groove; and the features of novelty which distinguish our invention from former improvements in the particular art lie in the fact that no longitudinal movement of the band or bands or of the hub occurs during the act of compressing the band or bands in the groove wherein said band or bands are seated. By our method of compressing the band a moderate but equal pressure is produced upon the end grain of the wood on each side of the groove, and the groove is completely filled by the band. In the old system forcing the hub and band into the conical die causes an undue pressure on the end grain of the wood upon one side of the groove, and the metal of the band is drawn away from the other side, thus causing a looseness of the band at one side or edge of the groove and an injurious strain upon the other side.

In the accompanying drawings, Figure 1 illustrates a wooden hub before its ends have been turned off to receive the point and butt band. In this figure one of the metallic strengthening-bands is shown applied, while the remaining strengthening-band is shown in section, so as to expose the annular groove in the hub. Fig. 2 illustrates the hub, with its ends properly turned and both of the metallic strengthening-bands applied. Fig. 3 is a longitudinal section of the hub, taken on the line *x x*, Fig. 2. Fig. 4 is an edge view of the blank. Fig. 5 illustrates the band after it has been bent into circular form, but before its ends have been welded together and the band rolled into its ultimate shape, a section taken through the lapping ends of the band being included in said figure. Fig. 6 represents the metallic strengthening-band after its ends have been welded together and the band rolled into shape, said figure including a cross-section of the band, and also showing in section different shapes into which the band may be rolled. Fig. 7 illustrates a similar band formed from a strip of such length that when ready for welding the strip forms a full coil, the ends thereof meeting upon opposite sides of the strip or overlapping each other.

A indicates an ordinary wooden hub which is provided with one or more V-shaped peripheral grooves, B, located between the spoke-line or middle of the hub and the ends thereof. The metal strengthening-bands C, which are preferably applied before the ends of the hub are turned off, are first formed, as in Fig. 4, rectangular in cross-section, with a segmental taper or incline from shoulders $a$ to its terminals. These shoulders are formed on opposite sides of the band at points between its middle and its ends, but nearer the former than the latter portions of the strip or band. The strip is then bent by suitable machinery into the annular form shown in Fig. 5, in which it will be seen that the terminals of the band meet the shoulders $a$ with each tapering end portion lapping the other and extending about one-half the circumference of the completed annular band. The band is then heated and its lapping portions welded together by subjecting it to the action of suitable dies or rollers, so as to form a continuous or seamless band. Instead, however, of forming the band from a strip having shoulders $a$ and tapered ends, as described, it may be constructed from a plain flat strip, C′, as shown in Fig. 7, being of such length that the ends thereof meet upon opposite sides of the middle portion of said strip, or even overlap each other. In either case, after being coiled or bent into the required shape and then welded in the manner described, it is rolled by suitable machinery so as to give it in cross-section any one of the shapes shown in the sectional views included in Fig. 6, thereby adapting it to the form of groove B which the band is designed to occupy. The band, which is now ready to be secured on the hub, is slipped on the latter until it is brought over one of the annular grooves, and it is then subjected to a uniform pressure applied to the surface of the band and in radial or concentering lines toward the center or axis of the hub, thereby upsetting it and reducing its diameter, so that it shall be compressed entirely within the annular groove, no longitudinal movement being imparted to the band or bands or to the hub during the act of compressing the former in the groove or grooves, and thereby all longitudinal strain on the hub is avoided. It will be seen that by exerting such pressure in radial or concentering lines at right angles to the axis of the hub there will be no tendency to shift the band toward the middle or spoke-line of the hub, such as occurs when the hub is driven in a conical female die, and hence that the band will not be forced in the direction of the grain of the wood against that side of the groove which is nearest the spoke-line with such pressure as would endanger the wood. It will also be seen that the inclined or beveled sides of the band, when the latter is thus compressed or upset, press the fiber of the wood toward the axis of the hub in lieu of pressing in the direction of its length, and that after the band has been thus compressed or upset its said beveled sides will bind upon the wood fibers at and near the face or perimeter of the hub, thus securing the same against injury in an efficient manner. After the metallic strengthening-bands have been thus applied, the ends of the hub can be turned so as to receive the hub-cap and the sand-band, as shown in Figs. 2 and 3, in which D indicates the end of the sand-band and E the end for the hub-cap.

The hub may be turned into shape either before or after applying the strengthening-bands; but it is desirable generally to apply the bands first. When this is done they are compressed within the annular grooves to such a degree that the outer surface of each band is forced below the periphery of the hub, in order that when the latter is turned and finished the surface shall be flush with the bands, as shown in Figs. 2 and 3.

Instead of making the band triangular in cross-section, it may be made plano-convex or "half-round," with equally advantageous results, as shown in the sectional portions of Fig. 6. Moreover, if desired, it may be rolled into such shape that in cross-section it shall be triangular with the outer face or hypotenuse plane, and the two legs inwardly curved, so as to form a double concave between the apices of the cross-section.

The form of band employed and its mode of manufacture will be made the subject-matter of a separate application for patent.

An application for Letters Patent filed July 10, 1882, comprises a machine for compressing bands in grooves formed in the periphery of the hub, the pressure being exerted upon the entire outer surface of the bands in radial or concentering lines at right angles to the axis of the hub without any longitudinal movement of the hub or of the bands while the latter are being compressed. The above-named machine is an efficient instrument to compress the bands in the manner described; but we do not confine our invention to the use of such machine, as other instrumentalities may be used to effect the same result.

Having thus described our invention, what we claim is—

1. The method of banding hubs substantially as herein described, which consists in making an annular peripheral groove in the hub and compressing therein a solid metallic band by pressure exerted upon its surface in radial or concentering lines without producing unequal end-pressure upon the grain of the wood.

2. A wooden hub strengthened by one or more seamless metallic bands pressed in annular peripheral grooves in the hub by pressure exerted upon the surface of the band in radial or concentering lines at right angles to the axis of the hub without any longitudinal movement being imparted to either the band or bands or to the hub during the act of compressing.

3. The combination, with a wooden hub provided with one or more annular grooves formed in its periphery, of the continuous annular metallic strengthening-band, which is triangular or plano-convex in cross-section, and which is pressed in the said groove by pressure exerted upon the surface of the band acting in radial or concentering lines at right angles to the axis of the hub without any longitudinal movement of the band or bands or the hub while compressing the band or bands, substantially as described.

In testimony whereof we have hereunto set our hands in the presence of two subscribing witnesses.

THOS. BROWN.
SAMUEL N. BROWN.

Witnesses:
HORACE McDERMONT,
WEBSTER W. SHUEY.